(12) United States Patent
Izumi

(10) Patent No.: US 7,746,948 B2
(45) Date of Patent: Jun. 29, 2010

(54) WIRELESS COMMUNICATION APPARATUS AND WIRELESS COMMUNICATION METHOD

(75) Inventor: Seiichi Izumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 11/304,579

(22) Filed: Dec. 16, 2005

(65) Prior Publication Data

US 2006/0159188 A1 Jul. 20, 2006

(30) Foreign Application Priority Data

Dec. 28, 2004 (JP) ............................... 2004-378944

(51) Int. Cl.
*H04B 7/02* (2006.01)
(52) U.S. Cl. ..................... 375/267; 375/260; 375/262; 375/295; 375/299; 375/316; 370/210; 370/252; 370/343; 455/132; 455/450
(58) Field of Classification Search ................. 375/130, 375/135, 203, 260, 267, 316, 350, 353, 375, 375/259, 292, 295, 299, 342–343, 359, 371; 455/132, 230, 450; 370/210, 208, 203, 252, 370/343, 345, 469
See application file for complete search history.

(56) References Cited

U.S. PATENT DOCUMENTS

| | | | |
|---|---|---|---|
| 6,862,262 B1 * | 3/2005 | Imamura .................... 370/210 |
| 7,408,976 B1 * | 8/2008 | Narasimhan et al. ........ 375/148 |
| 7,409,024 B2 * | 8/2008 | Ginesi et al. ................ 375/362 |
| 7,447,163 B1 * | 11/2008 | Thomson et al. ............ 370/252 |
| 7,498,852 B1 * | 3/2009 | Agarwal et al. ............. 327/105 |
| 2004/0137906 A1 * | 7/2004 | Nakao et al. ................ 455/450 |
| 2007/0280394 A1 * | 12/2007 | Fung et al. .................. 375/362 |

* cited by examiner

*Primary Examiner*—Shuwang Liu
*Assistant Examiner*—Hirdepal Singh
(74) *Attorney, Agent, or Firm*—Oblon, Spivak, McClelland, Maier & Neustadt, L.L.P.

(57) ABSTRACT

Disclosed is a wireless communication apparatus which synthesize signals received from a plurality of antennas to separate the signals into synthesis signals of a plurality of logical channels. The apparatus has a first phase corrector correcting a phase of a reception signal by estimating an amount of phase correction by a frequency offset of each reception signal from the plurality of antennas; a synthesizer synthesizing reception signals after phase correction by the first phase corrector to separate the reception signals into synthesis signals of a plurality of logical channels; and a second phase corrector correcting a phase of a synthesis signal by estimating an amount of phase correction by a residual frequency offset after phase correction by the first phase corrector based on the synthesis signal synthesized by the synthesizer.

16 Claims, 10 Drawing Sheets

WIRELESS COMMUNICATION APPARATUS AND WIRELESS COMMUNICATION METHOD

CROSS REFERENCES TO RELATED APPLICATIONS

The present invention contains subject matter related to Japanese Patent Application No. 2004-378944 filed in the Japanese Patent Office on Dec. 28, 2004, the entire contents of which being incorporated herein by reference.

BACKGROUND OF THE INVENTION

1. Field of the Invention

The present invention relates to a wireless communication apparatus and a wireless communication method for realizing broadband wireless transmission between a plurality of wireless stations, such as a wireless LAN (Local Area Network) or PAN (Personal Area Network). In particular, the invention relates to a wireless communication apparatus and a wireless communication method for expanding the transmission capacity by carrying out MIMO (Multi Input Multi Output) communication which uses spatial multiplexing and forms a plurality of logical channels, pairing a transmitter having a plurality of antennas with a receiver having a plurality of antennas.

More specifically, the invention relates to a wireless communication apparatus and a wireless communication method for solving the problem of a frequency error of a reception signal when a receiver performs MIMO synthesis on signals received from a plurality of antennas to spatially separate the signals into a plurality of orthogonal MIMO channels. In particular, the invention relates to a wireless communication apparatus and a wireless communication method for solving the problem of a frequency error and a timing drift when a receiver performs MIMO synthesis on signals received from a plurality of antennas to spatially separate the signals into a plurality of orthogonal MIMO channels in a MIMO communication system that employs multicarrier modulation.

2. Description of the Related Art

As a technology for realizing a higher speed of wireless communication, MIMO (Multi-Input Multi-Output) communication is coming to attention. This technology is for expanding transmission capacity and achieving improvement in communication speed by realizing spatially multiplexed transmission channels (hereinafter also referred to as "MIMO channels") with a plurality of antenna elements at a transmitter and a receiver respectively.

In a MIMO communication system, a transmitter distributes transmission data to a plurality of antennas and transmits it through a plurality of virtual/logical MIMO channels, and a receiver obtains reception data by processing signals received by a plurality of antennas. In this manner, the MIMO communication system utilizes channel characteristics and differs from a simple transmission/reception adaptive array. The MIMO communication can increase the channel capacity according to the number of antennas without increase of the frequency band and accordingly has higher efficiency of frequency utilization.

FIG. 7 schematically shows the configuration of a MIMO communication system. As shown in FIG. 7, each of a transmitter and a receiver is equipped with a plurality of antennas. The transmitter space-time encodes a plurality of transmission data, multiplexes the encoded data, distributes the multiplexed signals to M antennas, and transmits them into a plurality of MIMO channels. The receiver receives the multiplexed transmission signals by N antennas through the MIMO channels and space-time decodes the received transmission signals to obtain reception data. In this case, the channel model is composed of a radio wave environment around the transmitter (transfer function), a structure of the channel space (transfer function), and a radio wave environment around the receiver (transfer function). Multiplexing the signals transmitted from the antennas involves crosstalk. However, it is possible to correctly extract the multiplexed signals without crosstalk through signal processing at the receiver.

Before transmitting the multiplexed signals, the MIMO transmitter transmits a training signal, e.g., for each antenna in a time-division manner, with which the receiver performs channel estimation. On the other hand, the MIMO receiver performs channel estimation at a channel estimation unit using training signals and calculates a channel information matrix H corresponding to the antenna pairs. Based on the channel information matrix H, the receiver improves the signal-to-noise ratio to enhance the degree of certainty of decoding.

Further, the MIMO transmitter space-time encodes a plurality of transmission data, multiplexes the encoded data, distributes the multiplexed signals to M antennas, and transmits them into a plurality of MIMO channels. The receiver receives the multiplexed transmission signals by N antennas through the MIMO channels and space-time decodes the received transmission signals to obtain reception data. Multiplexing the signals transmitted from the antennas involves crosstalk. However, it is possible to correctly extract the multiplexed signals without crosstalk through appropriate signal processing using the channel matrix at the receiver.

There are proposed a variety of methods for making up the MIMO transmission. However, it is an issue how channel information is exchanged between the transmitter and the receiver in accordance with an antenna configuration. MIMO transmission systems fall into two main types: an open-loop type of MIMO transmission system for performing spatial multiplexing transmission between the transmitter and the receiver being independent of each other, and as an extension of the open-loop type, a closed-loop type of MIMO transmission system for producing ideal spatial orthogonal channels between the transmitter and the receiver by feedback of channel information also from the receiver to the transmitter.

The open-loop type of MIMO transmission system can include V-BLAST (Vertical Bell Laboratories Layered Space Time) system (e.g., see patent document 1). The transmitter does not provide an antenna weighting coefficient matrix, but simply multiplexes a signal for each antenna and transmits. In this case, a feedback procedure for obtaining the antenna weighting coefficient matrix is all omitted.

Further, as an ideal form of the closed-loop type of MIMO transmission, there is known an SVD-MIMO system utilizing singular value decomposition (SVD) of a propagation function (e.g., see non-patent document 1). In the SVD-MIMO transmission, $UDV^H$ is obtained by performing the singular value decomposition of a numerical matrix whose elements denote channel information corresponding to respective antenna pairs, namely a channel information matrix H, and thus a transmission antenna weighting coefficient matrix V and a reception antenna weighting coefficient matrix $U^H$ are obtained. Thereby, each MIMO channel is expressed as a diagonal matrix D having the diagonal elements that are the square root of each eigenvalue $\lambda_i$, and signals can be multiplexed to be transmitted without any crosstalk. According to the SVD-MIMO transmission system, it is possible to realize a plurality of logically independent, spatially divided (i.e., spatially-multiplexed orthogonal) transmission channels at both the transmitter and the receiver. In theory, it is possible to achieve the maximum channel capacity. For example, if the transmitter and the receiver have two antennas each, it is possible to acquire double the transmission capacity at the maximum.

On the other hand, in the case of constructing a wireless network in a room, there is formed a multipath environment in which the receiver receives the superposition of direct waves and a plurality of reflected waves and delayed waves. A multipath produces delay distortion (or frequency selective fading), thereby causing an error in communication and interference between symbols.

Principal countermeasures against the delay distortion can include a multicarrier transmission system. In the multicarrier transmission system, transmission data is divided into multiple carriers having different frequencies for transmission. Accordingly, the bandwidth of each carrier becomes narrow, thereby being resistant to frequency selective fading.

For example, in an OFDM (Orthogonal Frequency Division Multiplexing) system which is one of the multicarrier transmission systems, the frequencies of carriers are set such that the carriers are orthogonal to each other in a symbol section. During information transmission, the transmitter converts information from serial to parallel form for each symbol period which is slower than an information transmission rate, assigns a plurality of converted data to each carrier, modulates the amplitude and phase of each carrier, transforms the modulated signals into time-domain signals while maintaining the orthogonality of each carrier in the frequency domain by performing an inverse FFT on the multiple carriers, and transmits the transformed signals. Further, during reception, as the inverse operations, the receiver transforms the time-domain signals to frequency-domain signals by performing an FFT, demodulates each carrier in accordance with each modulation scheme, and converts the demodulated signals from parallel to serial form to reproduce the information of an original serial signal.

IEEE802.11a/n which is a MIMO-transmission-applied LAN system adopts the OFDM modulation scheme.

In a general communication system, a preamble composed of known patterns is added to the head of a transmission frame (or packet) from the transmitter. Using the preamble, the receiver acquires synchronization and corrects a frequency offset to the transmitter. However, there is a problem of a residual frequency offset that an error remains in the case where an error arises in calculating a frequency offset due to noise etc.

In the case of a communication system to which the OFDM modulation scheme is applied, a frequency offset causes all subcarriers to rotate uniformly for each OFDM symbol. FIG. 8 shows in three dimensions the ratios between modulation points and subcarriers after channel correction on the phase space (constellation). The residual frequency offset is not so large that interference between subcarriers occurs. However, since the receiver merely corrects frequency offsets at the head (preamble) of a packet, as shown in FIG. 8 phase shifts are accumulated as OFDM symbols continue, thereby degrading the communication quality.

Further, in the multicarrier transmission system, there is a problem that a timing drift occurs during long continuous data symbols. A timing drift causes a twist of subcarrier phases. Since the receiver merely corrects frequency offsets at the head (preamble) of a packet, timing drifts are accumulated as OFDM symbols continue, and consequently the phase twist becomes larger as shown in FIG. 9, thereby degrading the communication quality. Further, both a frequency offset and a timing offset cause all subcarriers to rotate uniformly and twist, as shown in FIG. 10.

For example, in a SISO system in which data transmission is performed between a transmitter and a receiver each having a single antenna, it is possible to perform a phase track of a residual frequency estimation error of a reception signal using a pilot subcarrier (e.g., see non-patent document 2).

Further, in a multicarrier communication apparatus of the SISO type, by reproducing a reference phase and amplitude at the burst head, estimating a residual frequency offset from pilot information included in a detecting symbol and the preceding reference phase information, and generating reference phase information which is used at the time of detecting a symbol from the estimated residual frequency offset, it is possible to perform excellent demodulation (e.g., see patent document 4).

On the other hand, the MIMO receiver which synthesizes signals received from a plurality of antennas can perform synchronization acquisition and frequency correction using the preambles of the reception signals before MIMO synthesis; however, there is a problem that errors after frequency correction, i.e., residual frequency offsets are subjected to MIMO synthesis.

As described above, in the case of a long packet length, the MIMO-synthesized residual errors are accumulated as data symbols continue, thereby causing the phase rotation and phase twist which lead to errors. Especially in high modulation modes such as 64QAM and 256QAM, the communication is more susceptible to residual errors, thereby obstructing the achievement of high-throughput data transmission.

For example, there is proposed a wireless apparatus having a structure for compensating a frequency offset at the time of transmitting and receiving a signal with the MIMO system (e.g., see patent document 2). The wireless apparatus includes a plurality of antennas, a carrier oscillator which generates carriers for synchronization detection, multipliers which perform detection processing by multiplying a plurality of reception signals from a plurality of antennas by respective carriers, a frequency offset estimator which estimates one frequency offset based on the signals from the respective multipliers, and a frequency offset corrector which performs correction processing of the frequency offset on the signals from the respective multipliers based on a frequency offset estimate.

In the structure of the wireless apparatus, synchronization acquisition and frequency correction are performed before MIMO synthesis of the reception signals (i.e., spatial separation into each MIMO channel). The frequency offset estimator of the wireless apparatus is a common circuit for performing frequency offset estimation before MIMO synthesis, and no mention is made of how to process a residual estimation error after MIMO channel synthesis.

Further, there is proposed a wireless signal receiving apparatus which prevents the degradation of communication quality that occurs in the case of performing frequency correction by applying a carrier frequency error estimate obtained for each antenna route in the MIMO transmission (e.g., see patent document 3). In this case, the wireless signal receiving apparatus controls a carrier frequency error arising from multipath fading and thermal noise by obtaining a phase variation arising from the carrier frequency error after averaging autocorrelation values of pilot signals calculated for each antenna route, and provides commonality of the center frequencies of baseband signals among antenna routes by using the same carrier frequency correction value in all antenna routes, thereby improving the accuracy of the inverse function of a transfer function.

However, the wireless signal receiving apparatus extracts only pilot subcarriers having fixed phases before MIMO synthesis and estimates frequency errors by calculating the auto-correlation among OFDM symbols. In other words, residual components after the frequency correction are not treated; therefore, it may be impossible to eliminate the influence of phase rotations and phase twists by the MIMO-synthesized residual errors.

[Patent document 1] Japanese Patent Application Laid-Open No. 10-84324
[Patent document 2] Japanese Patent Application Laid-Open No. 2003-283359
[Patent document 3] Japanese Patent Application Laid-Open No. 2004-72458
[Patent document 4] Japanese Patent Application Laid-Open No. 13-69113
[Non-patent document 1] http://radio3.ee.uec.ac.jp/MIMO(IEICE_TS).pdf (as of Oct. 24, 2003)
[Non-patent document 2] "802.11 high-speed wireless LAN textbook" by Matsue and Morikura (IDC Japan, IDC Information Series, 194 pages, First Edition: March 2003)

SUMMARY OF THE INVENTION

It is desirable to provide a wireless communication apparatus and a wireless communication method excellent at being able to expand the transmission capacity by carrying out MIMO communication which uses spatial multiplexing and forms a plurality of logical channels, pairing a transmitter having a plurality of antennas with a receiver having a plurality of antennas.

Further, it is desirable to provide a wireless communication apparatus and a wireless communication method excellent at being able to solve the problem of a frequency error of a reception signal when a receiver performs MIMO synthesis on signals received from a plurality of antennas to spatially separate the signals into a plurality of orthogonal MIMO channels.

Furthermore, it is desirable to provide a wireless communication apparatus and a wireless communication method excellent at being able to solve the problem of a frequency offset of a frequency error and a timing drift when a receiver performs MIMO synthesis on signals received from a plurality of antennas to spatially separate the signals into a plurality of orthogonal MIMO channels.

According to an embodiment of the present invention, there is provided a wireless communication apparatus which synthesizes signals received from a plurality of antennas to separate the signals into synthesis signals of a plurality of logical channels. The wireless communication apparatus includes a first phase corrector correcting a phase of a reception signal by estimating an amount of phase correction by a frequency offset of each reception signal from the plurality of antennas, a synthesizer synthesizing reception signals after phase correction by the first phase corrector to separate the reception signals into synthesis signals of a plurality of logical channels, and a second phase corrector correcting a phase of a synthesis signal by estimating an amount of phase correction by a residual frequency offset after phase correction by the first phase corrector based on the synthesis signal synthesized by the synthesizer.

In a general communication system, a preamble composed of known patterns is added to the head of a packet from the transmitter, and the receiver acquires synchronization and corrects a frequency offset to the transmitter, using the preamble. However, an error remains in the case where an error arises in calculating a frequency offset due to noise etc. Further, in the multicarrier transmission system, during long continuous data symbols, there occurs a timing drift which leads to a twist of subcarrier phases, thereby degrading the communication quality.

Furthermore, the MIMO receiver which synthesizes signals received from a plurality of antennas can perform synchronization acquisition and frequency correction using the preambles of the reception signals before MIMO synthesis; however, there is a problem that errors after frequency correction, i.e., residual frequency offsets are subjected to MIMO synthesis.

On the other hand, according to the embodiment of the invention, the wireless communication apparatus estimates a residual frequency offset based on the synthesis signal of each MIMO channel after MIMO synthesis and performs phase correction of the synthesis signal based on the residual frequency offset, thereby making it possible to improve an error rate of the MIMO communication apparatus.

Since the MIMO synthesis is the primary synthesis, the residual frequency offset remains, so that the MIMO communication apparatus can estimate the frequency offset afterward.

Further, in the case of applying a multicarrier transmission system such as OFDM, the wireless communication apparatus determines an amount of phase correction of each subcarrier by unifying a frequency offset and a phase shift by a timing offset.

The invention can improve the error rate of the MIMO communication apparatus, and has more effect of improving the error rate in the case of a long packet in which residual frequency offsets and timing drifts are accumulated, a high modulation mode such as 64QAM and 256QAM in which the communication is susceptible to phase errors, a low S/N ratio, etc. The increase of the error rate can improve the substantial throughput of MIMO communication, thereby enhancing the speed of wireless transmission. Further, it is possible to decrease the degradation by phase noise.

The wireless communication apparatus according to an embodiment of the invention can adopt the multicarrier transmission system typified by OFDM. In this case, there is a problem that timing drifts are accumulated as OFDM symbols continue so that the phase twist of reception signals becomes larger. Therefore, in the case of applying the multi-carrier transmission system, the second phase corrector determines an amount of phase correction of each subcarrier by unifying a frequency offset and a phase shift by a timing offset and performs phase correction.

The second phase corrector may determine an amount of phase correction separately for each logical channel based on a frequency offset and a timing offset which are estimated from each logical channel and perform phase correction for each logical channel. That is, the second phase corrector estimates the phase shifts of pilot subcarriers and the phase differences between the modulation points and the reception signal points of data subcarriers, separately for the respective synthesis signals of the MIMO channels.

Alternatively, the second phase corrector may determine an amount of phase correction common to all logical channels by unifying a frequency offset and a timing offset which are estimated from a synthesis signal of each logical channel and perform phase correction for each logical channel based on the amount of phase correction. That is, it is also possible to estimate the amount of phase correction by averaging the phase shifts of pilot subcarriers and the phase differences between the modulation points and the reception signal points of data subcarriers over a plurality of synthesis signals. In this case, it is possible to cancel the influence of noise that occurs independently in each MIMO channel and improve the accuracy of phase correction by averaging them over the synthesis signals of the MIMO channels.

Further, the second phase corrector may average a frequency offset and a timing offset which are estimated for each logical channel, with a weight corresponding to a response of each logical channel. In this case, it is possible to apply a weight of each MIMO channel to the obtained estimates of the residual frequency offset and the timing drift for synthesis.

Furthermore, the second phase corrector can put a phase difference indicative of a frequency offset or a timing offset into an vector on an IQ plane, obtain an average value with the magnitude of the vector being a weight, and estimate an amount of phase correction by the frequency offset or the timing offset.

Furthermore, the second phase corrector can estimate a frequency offset using a pilot subcarrier in a received OFDM signal.

Furthermore, the second phase corrector can demodulate a received OFDM signal and estimate a frequency offset based on a phase difference between a modulation point and a reception signal point. In the case of estimating a residual frequency offset, the phases of subcarriers after channel correction are compared to the modulation points. The average of phase differences is the phase rotation from the channel estimate (update) time point and can be converted into the residual frequency offset.

Further, the second phase corrector can demodulate a received OFDM signal and estimate a frequency offset based on a rotation among subcarriers of a phase difference between a modulation point and a reception signal point. In the case of estimating a residual frequency offset and a timing drift, the average of phase differences between the phases of subcarriers after channel correction and the modulation points is converted as a residual frequency offset, and the gradient of the phase differences can be converted into the timing drift.

According to the embodiment of the invention, it is possible to provide a wireless communication apparatus and a wireless communication method excellent at being able to expand the transmission capacity by carrying out MIMO communication which uses spatial multiplexing and forms a plurality of logical channels, pairing a transmitter having a plurality of antennas with a receiver having a plurality of antennas.

Further, according to the embodiment of the invention, it is possible to suitably solve the problem of a frequency error of a reception signal when a receiver performs MIMO synthesis on signals received from a plurality of antennas to spatially separate the signals into a plurality of orthogonal MIMO channels.

Furthermore, according to the embodiment of the invention, it is possible to suitably solve the problem of a frequency offset of a frequency error and a timing drift when a receiver performs MIMO synthesis on signals received from a plurality of antennas to spatially separate the signals into a plurality of orthogonal MIMO channels.

The invention can improve the error rate of the MIMO communication apparatus, and has more effect of improving the error rate in the case of a long packet in which residual frequency offsets and timing drifts are accumulated, a high modulation mode such as 64QAM and 256QAM in which the communication is susceptible to phase errors, a low s/N ratio, etc. The increase of the error rate can improve the substantial throughput of MIMO communication, thereby enhancing the speed of wireless transmission. Further, it is possible to decrease the degradation by phase noise.

These and other features and advantages of the invention will be apparent from the following more particular description of preferred embodiments of the invention, as illustrated in the accompanying drawings.

BRIEF DESCRIPTION OF THE DRAWINGS

Embodiments of the present invention will be described in detail based on the following figures, wherein.

DESCRIPTION OF THE PREFERRED EMBODIMENTS

Hereinafter, embodiments of the present invention will be described in detail with reference to the accompanying drawings.

The invention can be applied to a MIMO communication system. In the MIMO communication system, a transmitter and/or a receiver performs antenna synthesis in such a manner that the transmitter having a plurality of antennas and the receiver having a plurality of antennas make a pair and form a plurality of logical channels independent of each other, namely MIMO channels. According to the MIMO communication system, a plurality of RF transmission/reception units are put together in one wireless apparatus, thereby realizing large-capacity data transmission.

Figure 1:
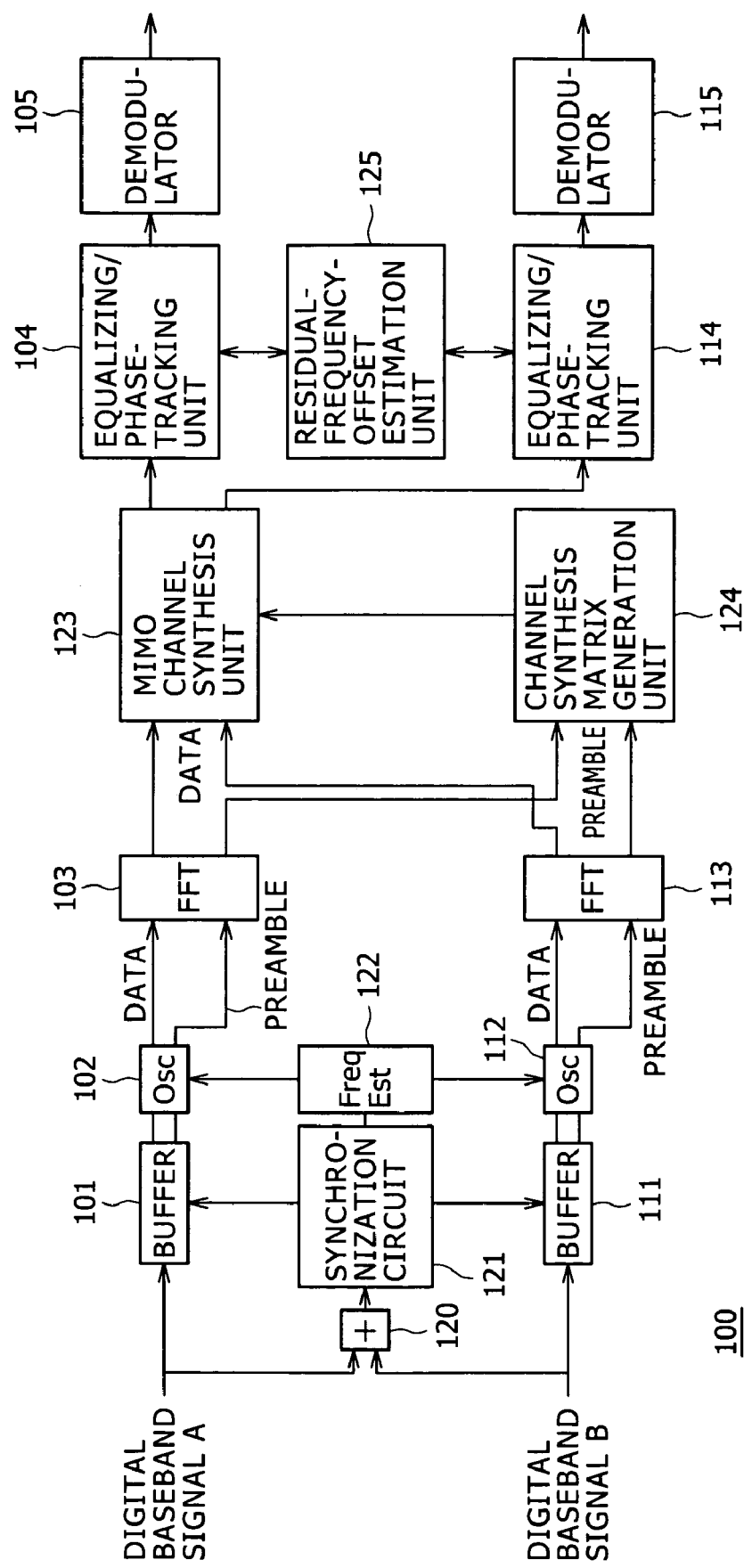
FIG. 1 is a schematic block diagram of a wireless communication apparatus according to an embodiment of the present invention.

FIG. 1 shows a schematic block diagram of a wireless communication apparatus according to an embodiment of the present invention. A wireless communication apparatus 100 shown in FIG. 1 can operate as a MIMO receiver. In the example of FIG. 1, two antenna routes are employed for simplicity of explanation. However, the invention can be applied in the same way, in the case of having three or more antenna routes.

A receiver demodulates each synthesis signal obtained by synthesizing digital baseband signals from the respective reception antennas so as to form independent MIMO channels, and obtains original bit strings through deinterleave, depuncture, and channel decoding.

In buffers 101 and 111, digital baseband signals A and B of the antenna routes are separated for each OFDM symbol by a synchronization circuit (timing detector) 121. At the same time, frequency offset correction units 102 and 112 perform frequency correction on the respective digital baseband signals A and B based on frequency error estimates from a frequency error estimation circuit (frequency estimator) 122, and then sends the corrected signals to Fourier transformers (FFT) 103 and 113 respectively.

At this time, frequency errors and timing errors are almost eliminated; however, errors remain in the case where errors arise in calculating frequency offsets due to noise etc. in the frequency error estimation circuit 122. The residual frequency offsets are sent to FFTs 103 and 113.

The FFTs 103 and 113 transform time-domain reception signals to frequency-domain signals to decompose reception signals into subcarrier signals. A channel synthesis matrix generation unit 124 generates a channel matrix H for each subcarrier based on the FFT outputs of the packet preamble part. The channel matrix H is necessary to form independent MIMO channels from reception signals of the antenna routes, that is, perform MIMO synthesis (or spatial separation).

A MIMO channel synthesis unit 123 synthesizes the FFT outputs of the packet data part for each subcarrier using the channel matrix to synthesize a plurality of independent MIMO channels. Since the MIMO synthesis is the primary synthesis, the residual frequency offsets remain and it is possible to perform frequency offset estimation afterward.

The MIMO-synthesized signals of the MIMO channels are sent to equalizing/phase-tracking units 104 and 114 and demodulated from the modulation points to the original values on the phase space (constellation) by demodulators (demappers) 105 and 115 after the correction of the residual frequency offsets and phase tracking.

As described above, the frequency offset correction units 102 and 112 perform the frequency correction of each signal based on the frequency error estimates from the frequency error estimation circuit 122; however, errors remain in the case where errors arise in calculating frequency offsets due to noise etc. in the frequency error estimation circuit 122. In the FFTs 103 and 113, the residual frequency offsets along with data are decomposed into subcarrier signals, which are then subjected to the primary synthesis in the MIMO channel synthesis unit 123.

The transmitter and the receiver use their oscillators respectively common to each branch and each branch in the receiver performs common synchronization and frequency correction, thereby equalizing the frequency offsets at all branches and also equalizing the timing drifts occurring from the difference between the oscillators of the transmitter and the receiver at all branches. These errors are subjected to primary transformation in the FFTs 103 and 113 and the MIMO channel synthesis unit 123; however, the residual frequency offsets and the timing drifts between the MIMO channels become equal.

Figure 8:
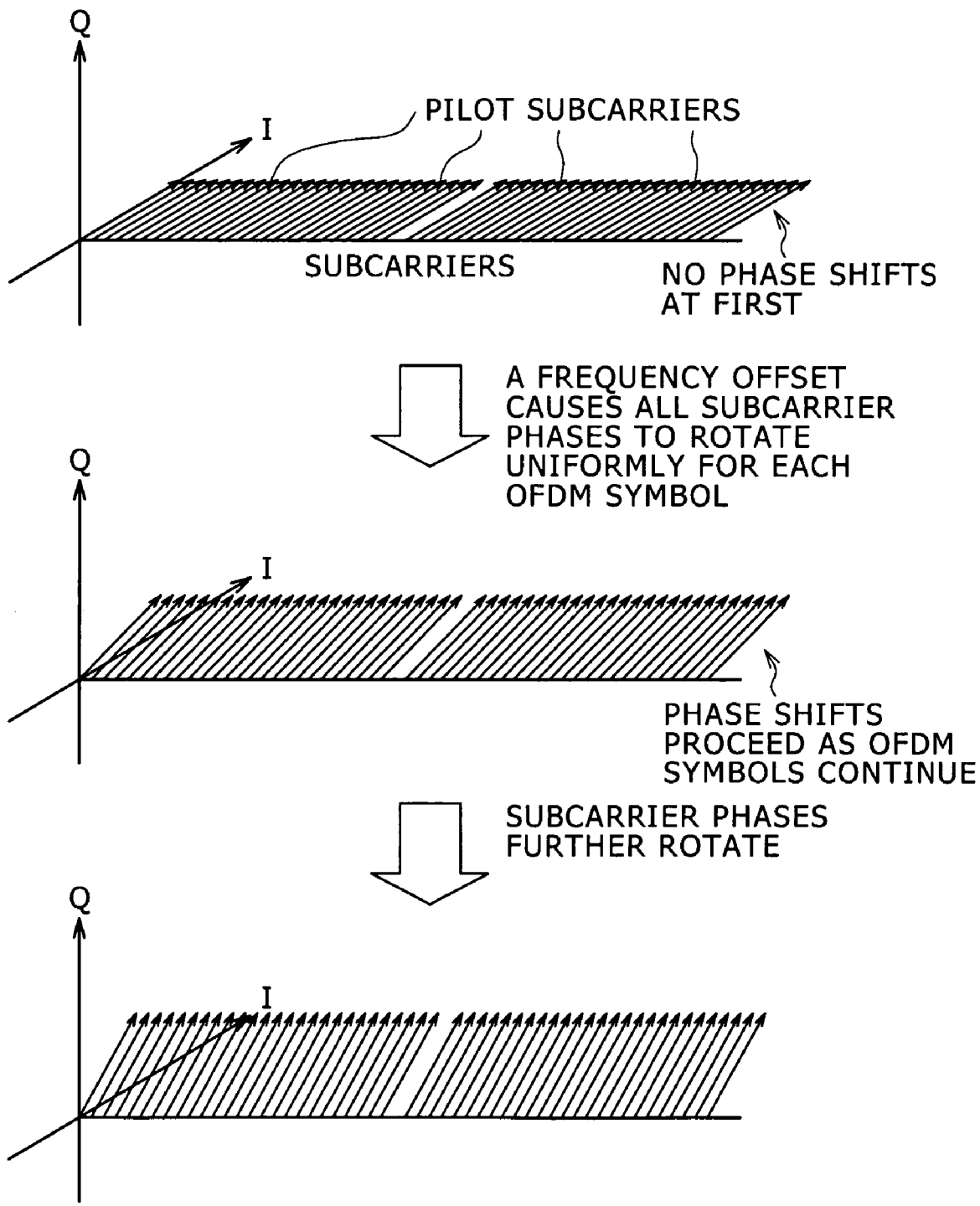
FIG. 8 is an illustration showing in three dimensions the ratios between modulation points and subcarriers after channel correction on the phase space (constellation)
Figure 9:
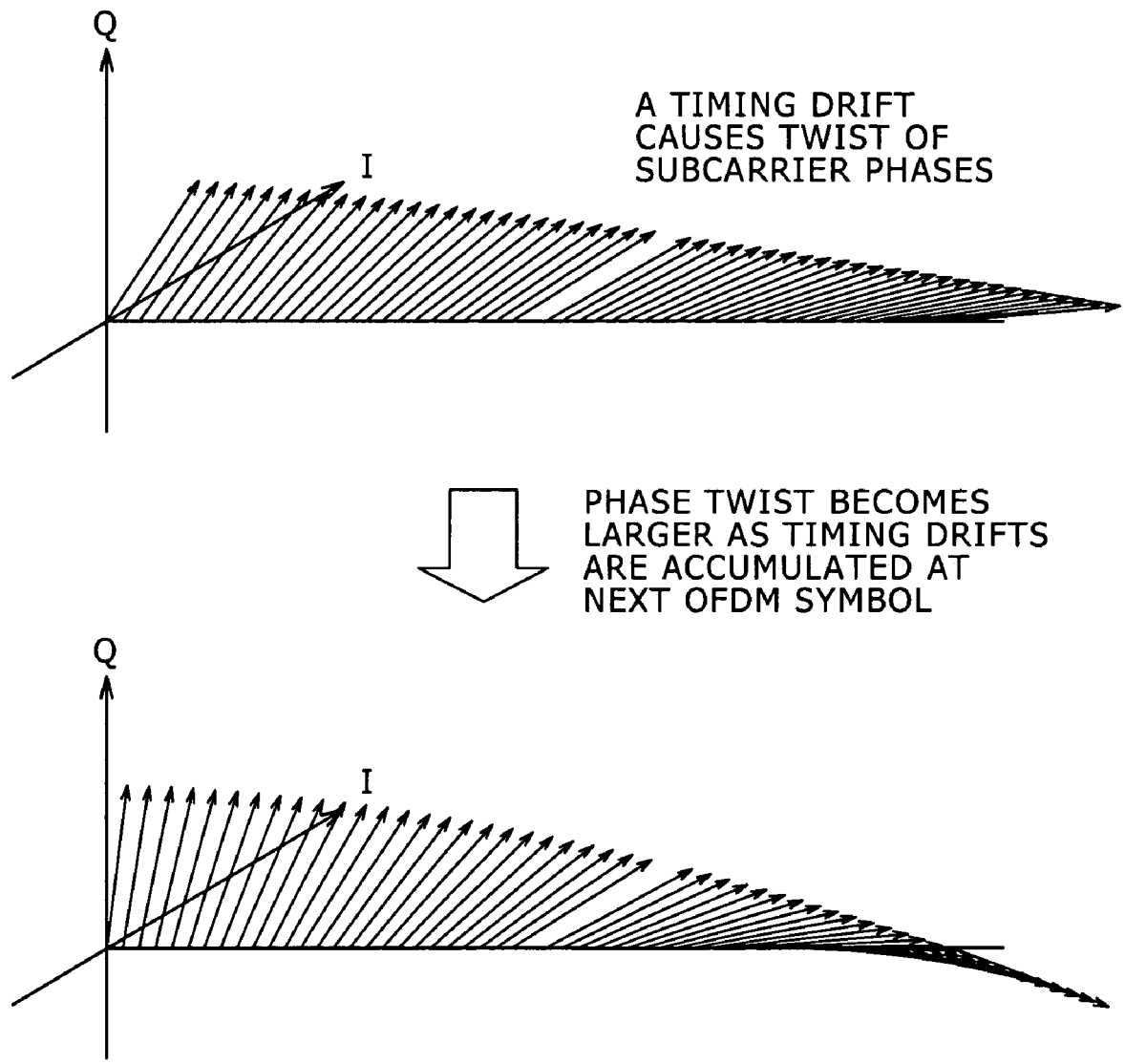
FIG. 9 is an illustration showing that timing drifts are accumulated as OFDM symbols continue so that a phase twist becomes larger.
Figure 10:
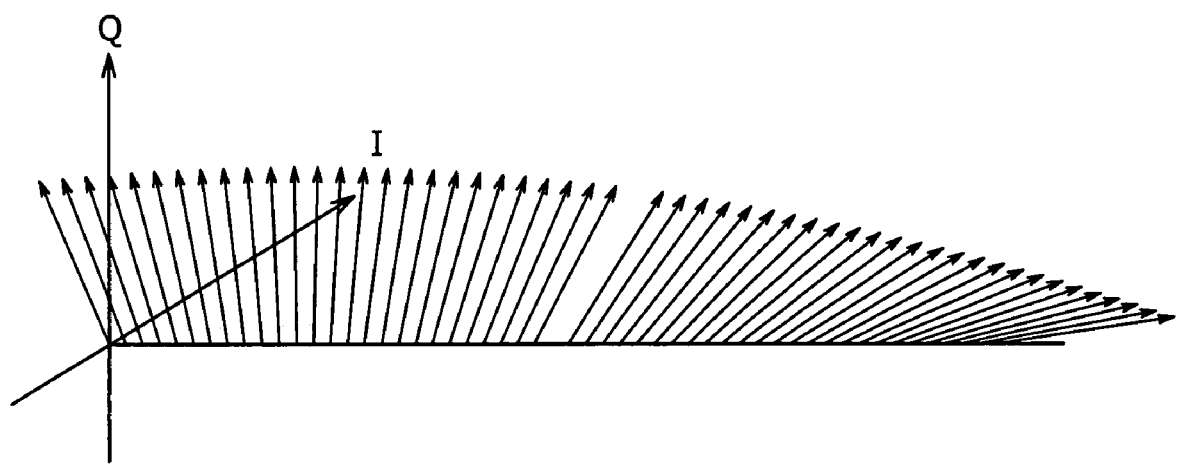
FIG. 10 is an illustration showing that both a frequency offset and a timing offset cause all subcarriers to rotate uniformly and twist.

The residual frequency offsets appear as uniform phase rotation at all subcarriers for each OFDM symbol. Further, as a result of FFT, the timing drifts appear as a phase twist across all subcarriers (see FIGS. 8 and 9). By correcting these phases, it is possible to correct the residual frequency offsets and the timing drifts. In a data OFDM symbol, it is possible to obtain MIMO channel phases using pilot subcarriers on which known modulation is performed. Alternatively, it is possible to obtain MIMO channel phases by temporarily demodulating a data OFDM symbol and comparing phases between modulation points and reception signal points.

Figure 2:
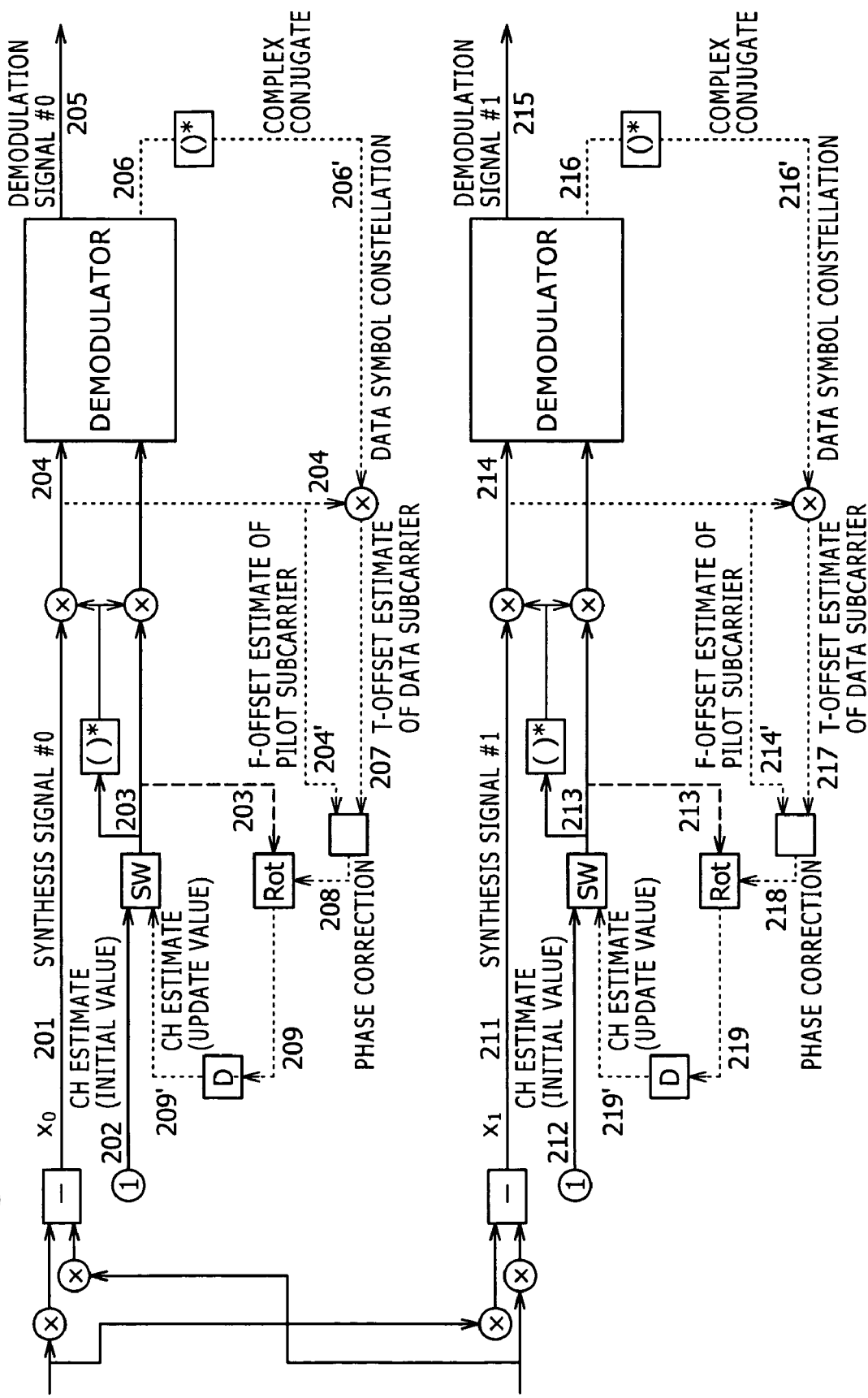
FIG. 2 is a detailed internal block diagram of equalizing/phase-tracking units 104 and 114 and a residual-frequency-offset estimation unit 125.

FIG. 2 shows a detailed internal block diagram of the equalizing/phase-tracking units 104 and 114 and a residual-frequency-offset estimation unit 125. Referring to FIG. 2, description will be made on the correction of a residual frequency offset and a timing drift.

Assuming that the channel matrix H is expressed by the following equation, signals $(y_0, y_1)$ obtained by the reception of spatially multiplexed transmission signals $(x_0, x_1)$ from the transmitter with each antenna of the receiver are expressed as $(ax_0+bx_1, cx_0+dx_1)$, respectively.

$$H = \begin{pmatrix} a & b \\ c & d \end{pmatrix}$$

$$\begin{pmatrix} y_0 \\ y_1 \end{pmatrix} = H \begin{pmatrix} x_0 \\ x_1 \end{pmatrix} = \begin{pmatrix} ax_0 + bx_1 \\ cx_0 + dx_1 \end{pmatrix} \qquad (1)$$

At the receiver, the MIMO channel synthesis unit 123 multiplies the reception signals $(y_0, y_1)$ by the inverse matrix $H^{-1}$ of the channel matrix, thereby making it possible to synthesize two orthogonal MIMO channels to spatially separate the reception signals into the synthesis signals $x_0$ and $x_1$ from the transmitter.

$$H^{-1} \begin{pmatrix} ax_0 + bx_1 \\ cx_0 + dx_1 \end{pmatrix} = H^{-1} H \begin{pmatrix} x_0 \\ x_1 \end{pmatrix} = \begin{pmatrix} x_0 \\ x_1 \end{pmatrix} \qquad (2)$$

Although channel estimates have not yet been obtained in the first subcarriers, the first MIMO-synthesized MIMO channel characteristics (i.e., initial values) can be 1s for all subcarriers. This is because the receiver performs channel synthesis using the inverse matrix $H^{-1}$ on the channel matrix H having the elements that are channel characteristics of respective MIMO channels between the transmitter and the receiver so that the synthesized channel becomes a unit matrix.

By multiplying synthesis signals 201 and 211 of the MIMO channels by complex conjugates 203 and 213 of channel estimates respectively, it is possible to estimate the amounts of phase rotation on which pilot subcarriers cannot perform phase correction, that is, frequency offsets 204' and 214' of pilot subcarriers.

On the other hand, synthesis reception signals 204 and 214 of the MIMO channels and channel strengths (the squares of complex conjugates 203 and 213 of channel estimates) are inputted to the demodulators 105 and 115 respectively. The demodulators 105 and 115 output demodulation signals 205 and 215 and the corresponding modulation points 206 and 216 respectively.

By calculating the respective complex conjugates 206' and 216' of the modulation points 206 and 216 and multiplying the complex conjugates 206' and 216' by the synthesis reception signals (i.e., reception signal points) 204 and 214 of the MIMO channels respectively, it is possible to estimate phase shifts 207 and 217 by the residual frequency offsets and the timing drifts of data subcarriers of the synthesis signals. However, in data subcarriers, incorrect demodulation brings about a different modulation point; therefore, it is preferable to unify estimated values of respective MIMO channels for higher accuracy by averaging processing.

By unifying the frequency offsets 204' and 214' of pilot subcarriers and the phase shifts 207 and 217 by the residual frequency offsets and the timing drifts of data subcarriers, the amounts of phase correction 208 and 218 of subcarriers are determined. Further, by applying the amounts of phase correction 208 and 218 to current channel estimates 203 and 213 respectively (i.e., providing the rotations corresponding to the amounts of phase correction) and delaying channel estimates 209 and 219 after the phase corrections, channel estimates 209' and 219' are provided in the next OFDM symbol.

Figure 5:
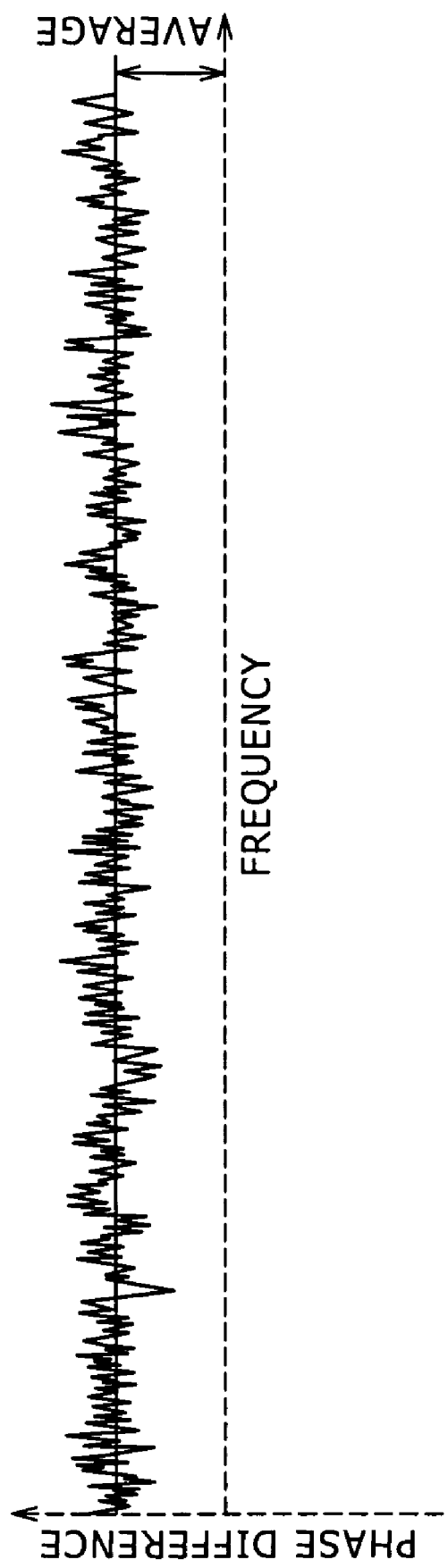
FIG. 5 is an illustration for explaining how to estimate a residual frequency offset comparing the phases of subcarriers after channel correction with modulation points.
Figure 6:
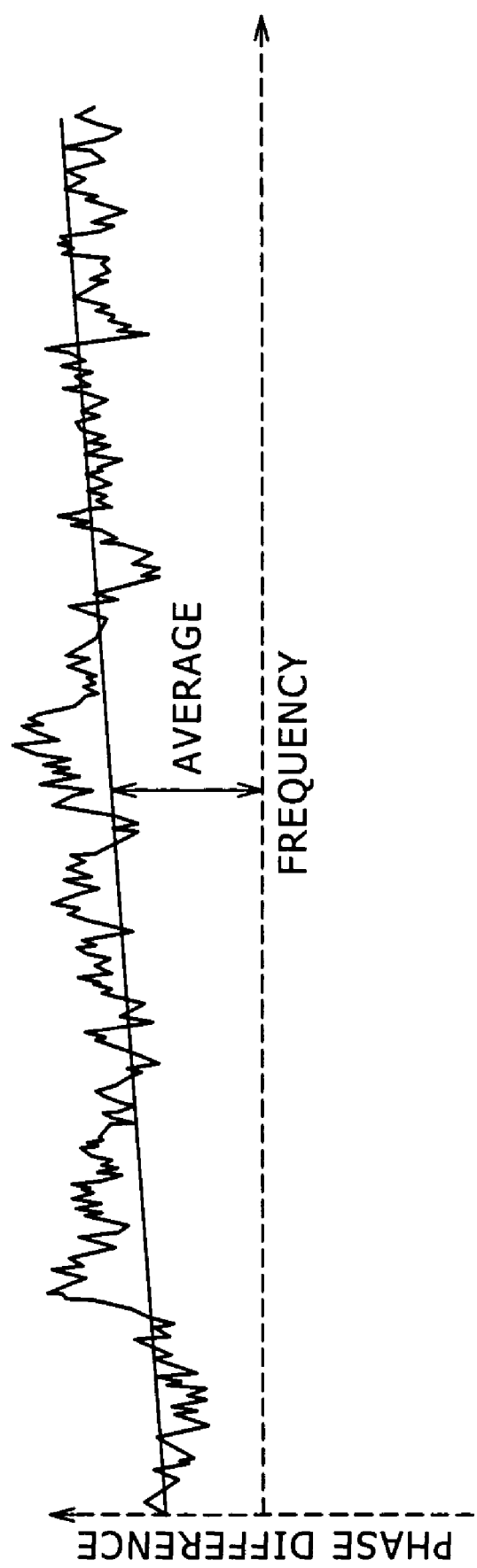
FIG. 6 is an illusration for explaining how to convert the average of the phase differences between the phases of subcarriers after channel correction and modulation points as a residual frequency offset and convert the gradient of the phase differences into a timing drift.
Figure 7:
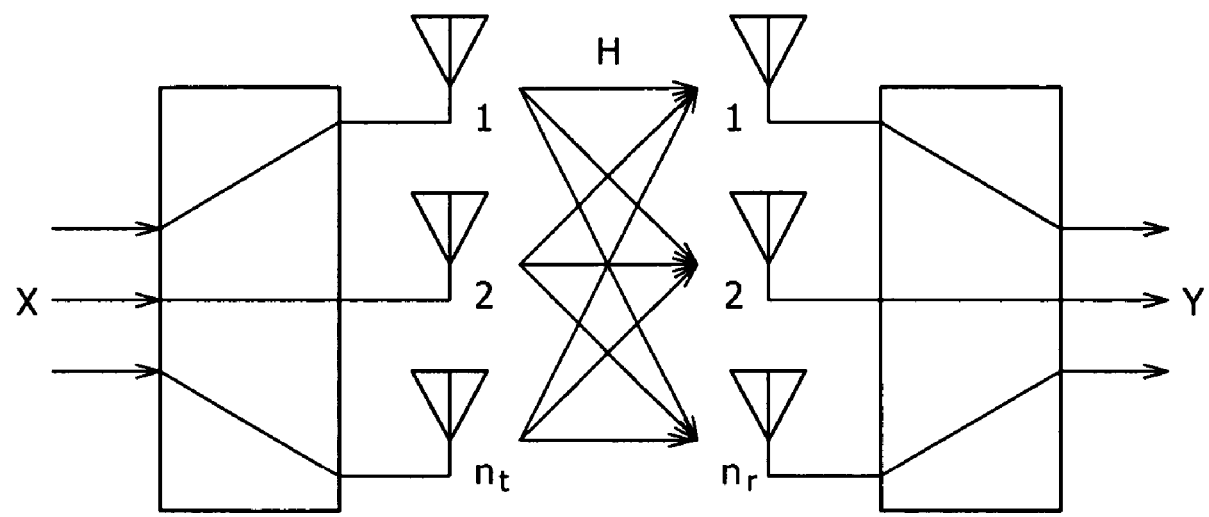
FIG. 7 is an illustration schematically showing the configuration of a MIMO communication system.

In the case of estimating a residual frequency offset, the phases of subcarriers after channel correction are compared to the modulation points. The average of phase differences is the phase rotation from the channel estimate (update) time point and can be converted into the residual frequency offset (see FIG. 5). Further, in the case of estimating a residual frequency offset and a timing drift, the average of the phase differences between the phases of subcarriers after channel correction and the modulation points is converted as a residual frequency offset, and the gradient of the phase differences can be converted into the timing drift (see FIG. 6).

As an example of a method for determining the amounts of phase correction of subcarriers, the average phase of pilot subcarriers of the signals 204' and 214' obtained by performing channel correction on the synthesis signals 201 and 211 of MIMO channels is treated as the amount of phase rotation of all subcarriers by residual frequency offsets, and the respective products 207 and 217 of the reception signal points 204 and 214 of subcarriers and the complex conjugates 206' and 216' of the modulation points 206 and 216 are averaged by inverting phases before and after the zero subcarrier, thereby providing the amounts of estimation of phase twists among subcarriers. In this manner, it is possible to determine the amounts of phase correction of subcarriers by adding twists centering on the amount of phase rotation of all subcarriers.

In the embodiment shown in FIG. 2, the phase shifts of pilot subcarriers and the phase differences between the modulation points and the reception signal points of data subcarriers are estimated separately for the respective synthesis signals of the MIMO channels. On the other hand, it is also possible to estimate the amount of phase correction by averaging the phase shifts of pilot subcarriers and the phase differences between the modulation points and the reception signal points of data subcarriers over a plurality of synthesis signals. In the latter case, it is possible to cancel the influence of noise that occurs independently in each MIMO channel and improve the accuracy of phase correction by averaging them over the synthesis signals of the MIMO channels.

Figure 3:
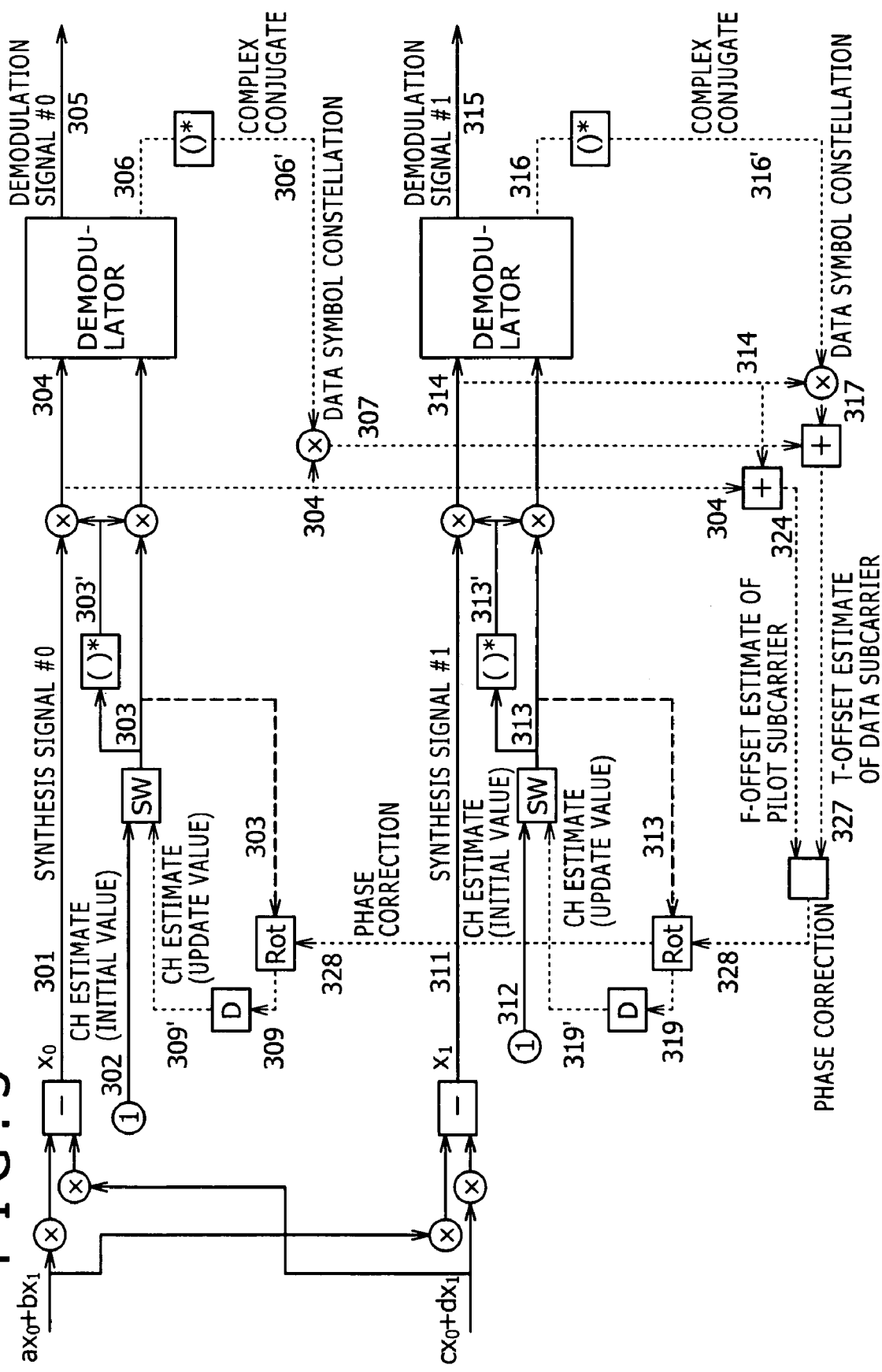
FIG. 3 is a detailed internal block diagram of the equalizing/phase-tracking units 104 and 114 and the residual-frequency-offset estimation unit 125 in the case of estimating the amount of phase correction by averaging the phase shifts of pilot subcarriers and the phase differences between the modulation points and the reception signal points of data subcarriers over a plurality of synthesis signals.

FIG. 3 shows a detailed internal block diagram of the equalizing/phase-tracking units 104 and 114 and the residual-frequency-offset estimation unit 125 in the case of estimating the amount of phase correction by averaging the phase shifts of pilot subcarriers and the phase differences between the modulation points and the reception signal points of data subcarriers over a plurality of synthesis signals.

At the receiver, the MIMO channel synthesis unit 123 multiplies the reception signals ($y_0$, $y_1$) by the inverse matrix $H^{-1}$ of the channel matrix, thereby making it possible to synthesize two orthogonal MIMO channels to spatially separate the reception signals into the synthesis signals $x_0$ and $x_1$.

Although channel estimates have not yet been obtained in the first subcarriers, the first MIMO-synthesized MIMO channel characteristics (i.e., initial values) are processed as is for all subcarriers (same as above).

By multiplying synthesis signals 301 and 311 of the MIMO channels by complex conjugates 303 and 313 of channel estimates respectively, it is possible to perform channel correction.

MIMO synthesis signals 304 and 314 after channel correction are inputted to the demodulators 105 and 115 respectively. The demodulators 105 and 115 output demodulation signals 305 and 315 and the corresponding modulation points 306 and 316 respectively.

By summing up the MIMO synthesis signals 304 and 314 after channel correction over subcarriers to average pilot subcarriers, an estimate 324 of a residual frequency offset common to the respective MIMO channels is obtained. Since synthesis signals #0 and #1 have a common residual frequency offset, it cannot be canceled by averaging processing.

Further, by summing up the differences (i.e., the respective products of the MIMO synthesis signals 304 and 314 and the complex conjugates 306' and 316' of the modulation points 306 and 316) 307 and 317 between the MIMO channel synthesis signals (i.e., reception signal points) 304 and 314 after channel correction and the modulation points 306 and 316 over subcarriers, an estimate 327 of a subcarrier phase twist (phase shift by the residual frequency offset and the timing drift of data subcarriers) common to the respective MIMO channels is obtained.

Further, by unifying the estimate 324 of the residual frequency offset common to the respective MIMO channels and the estimate 327 of the subcarrier phase twist common to the respective MIMO channels, the amount of subcarrier phase correction 328 common to the respective MIMO channels is determined for each subcarrier.

The determined amount of subcarrier phase correction 328 is distributed to each MIMO channel, and phase correction is performed for each MIMO channel. That is, by applying the amount of phase correction 328 to current channel estimates 303 and 313 (i.e., providing the rotation corresponding to the amount of phase correction) and delaying channel estimates 309 and 319 after the phase corrections, channel estimates 309' and 319' are provided in the next OFDM symbol.

In the embodiment shown in FIG. 3, the synthesis channel is normalized, and the phase tracking is started with the channel response of each subcarrier being 1. As a modification, there may be employed a synthesis signal having the amplitude of synthesis channel strength, that is, the eigenvalue or the singular value λ of the channel matrix H between the transmission and reception antennas.

In the SVD-MIMO transmission, at the MIMO receiver, $UDV^H$ is obtained by performing the singular value decomposition of a channel matrix H, and a transmission antenna weighting coefficient matrix V and a reception antenna weighting coefficient matrix $U^H$ are obtained. A matrix D thereby obtained is a diagonal matrix having the diagonal elements that are the square root of each eigenvalue $\lambda_i$, and the eigenvalue $\lambda_i$ is in proportion to the communication quality of the ith MIMO channel.

Figure 4:
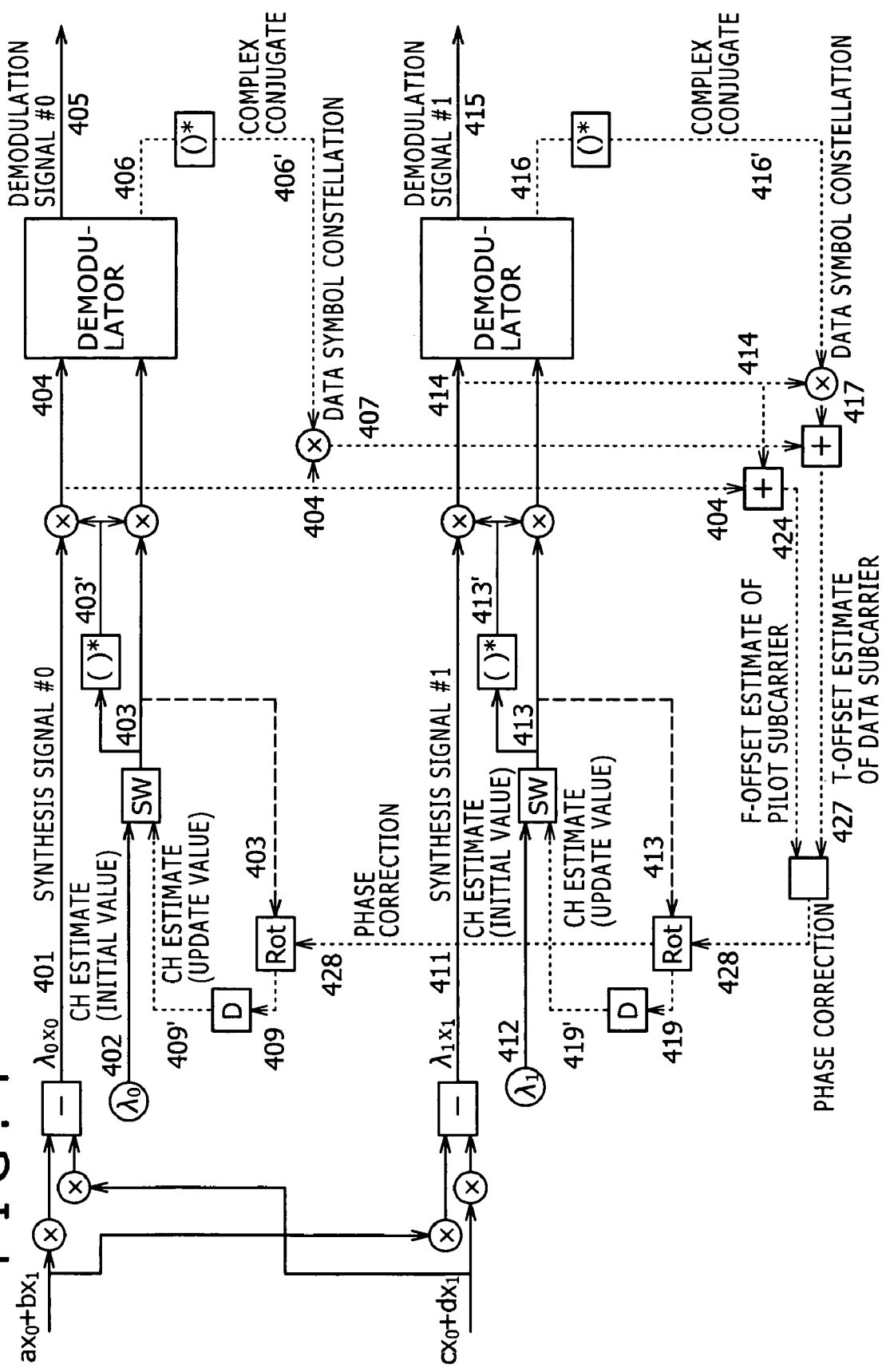
FIG. 4 is a detailed internal block diagram of the equalizing/phase-tracking units 104 and 114 and the residual-frequency-offset estimation unit 125 in the case of correcting a residual frequency offset and a timing drift using synthesis signals having the amplitudes of synthesis channel strengths.

FIG. 4 shows a detailed internal block diagram of the equalizing/phase-tracking units 104 and 114 and the residual-frequency-offset estimation unit 125 in the case of correcting the residual frequency offset and the timing drift using synthesis signals having the amplitudes of synthesis channel strengths. Hereinafter, $\lambda_0$ and $\lambda_1$ denote eigenvalues or singular values of two MIMO channels.

At the receiver, the MIMO channel synthesis unit 123 synthesizes the reception signals ($y_0$, $y_1$) to spatially separate the reception signals into two orthogonal MIMO channels and obtain the synthesis signals ($x_0$, $x_1$). Further, the MIMO channel synthesis unit 123 multiplies the synthesis signals by a diagonal matrix having the diagonal elements of $\lambda_0$ and $\lambda_1$, and obtains synthesis signals $\lambda_0 x_0$ and $\lambda_1 x_1$.

In the embodiment shown in FIG. 3, the initial value of the channel response of each subcarrier is 1. On the other hand, in this embodiment, $\lambda_0$ 402 and $\lambda_1$ 412 are adopted as the initial values.

By multiplying the synthesis signals 401 ($\lambda_0 x_0$) and 402 ($\lambda_1 x_1$) of the MIMO channels by complex conjugates 403 and 413 of channel estimates respectively, channel correction is performed.

MIMO synthesis signals 404 and 414 after channel correction are inputted to the demodulators 105 and 115 respectively. The demodulators 105 and 115 output demodulation signals 405 and 415 and the corresponding modulation points 406 and 416 respectively.

By summing up the MIMO synthesis signals 404 and 414 after channel correction over subcarriers to average pilot subcarriers, an estimate 424 of a residual frequency offset common to the respective MIMO channels is obtained.

Further, by summing up the differences (i.e., the respective products of the MIMO synthesis signals 404 and 414 and the complex conjugates 406' and 416' of the modulation points 406 and 416) 407 and 417 between the MIMO channel synthesis signals (i.e., reception signal points) 404 and 414 after channel correction and the modulation points 406 and 416 over subcarriers, an estimate 427 of a subcarrier phase twist (phase shift by the residual frequency offset and the timing drift of data subcarriers) common to the respective MIMO channels is obtained.

Further, by unifying the estimate 424 of the residual frequency offset common to the respective MIMO channels and the estimate 427 of the subcarrier phase twist common to the respective MIMO channels, the amount of subcarrier phase correction 428 common to the respective MIMO channels is determined for each subcarrier.

The determined amount of subcarrier phase correction 428 is distributed to each MIMO channel, and phase correction is performed for each MIMO channel. That is, by applying the amount of phase correction 428 to current channel estimates 403 and 413 (i.e., providing the rotation corresponding to the amount of phase correction) and delaying channel estimates 409 and 419 after the phase corrections, channel estimates 409' and 419' are provided in the next OFDM symbol.

In this embodiment, due to the estimation using the synthesis signals having the amplitudes of the synthesis channel strengths $\lambda_0$ and $\lambda_1$, it is possible to apply a weight of each MIMO channel to the obtained estimates of the residual frequency offset and the timing drift for synthesis. At the step of initial values, $|\lambda_0|^2 x_0$ and $|\lambda_1|^2 x_1$ are synthesized, and the square of a channel response denotes a weight.

The invention has been described in detail with reference to the specific embodiments. However, it is obvious that those skilled in the art can make modifications and/or substitutions of the embodiments without departing from the scope and sprit of the invention.

The present invention can be applied to a MIMO communication system, and in particular, suitably to a receiver in a MIMO communication system of the multicarrier type. Further, the invention is applicable regardless of the open-loop type such as V-BLAST or the closed-loop type such as SVD-MIMO.

That is, the embodiments have been described for illustrative purpose only, and the contents of the specification should not be interpreted restrictively. To understand the scope and sprit of the invention, the appended claims should be taken into consideration.

What is claimed is:

1. A wireless communication apparatus configured to synthesize signals received from a plurality of antennas to separate the signals into synthesis signals of a plurality of logical channels, the wireless communication apparatus comprising:
a first phase corrector configured to correct a phase of a reception signal by estimating an amount of phase correction by a frequency offset of each reception signal from the plurality of antennas;
a synthesizer configured to synthesize reception signals after phase correction by the first phase corrector to separate the reception signals into synthesis signals of the plurality of logical channels; and
a second phase corrector configured to correct a phase of a synthesis signal by estimating a second amount of phase correction by a residual frequency offset after the phase correction by the first phase corrector based on the synthesis signal synthesized by the synthesizer,
wherein in a multicarrier transmission, the second phase corrector determines the second amount of phase correction of each subcarrier by unifying the frequency offset and a phase shift by a timing offset and performs phase correction, and
wherein the second phase corrector puts a phase difference indicative of the frequency offset or the timing offset into a vector on an IQ plane, obtains an average value with the magnitude of the vector being a weight, and estimates the second amount of phase correction by the frequency offset or the timing offset.

2. The wireless communication apparatus according to claim 1, wherein the second phase corrector determines an amount of phase correction separately for each logical channel based on a frequency offset and a timing offset which are estimated from each logical channel and performs phase correction for each logical channel.

3. The wireless communication apparatus according to claim 1, wherein the second phase corrector determines an amount of phase correction common to all logical channels by unifying a frequency offset and a timing offset which are estimated from a synthesis signal of each logical channel and performs phase correction for each logical channel based on the amount of phase correction.

4. The wireless communication apparatus according to claim 3, wherein the second phase corrector averages a frequency offset and a timing offset which are estimated for each logical channel, with a weight corresponding to a response of each logical channel.

5. The wireless communication apparatus according to claim 1, wherein in OFDM modulation as a multicarrier transmission system, the second phase corrector estimates a frequency offset using a pilot subcarrier in a received OFDM signal.

6. The wireless communication apparatus according to claim 1, wherein in OFDM modulation as a multicarrier transmission system, the second phase corrector demodulates a received OFDM signal and estimates a frequency offset based on a phase difference between a modulation point and a reception signal point.

7. The wireless communication apparatus according to claim 1, wherein in OFDM modulation as a multicarrier transmission system, the second phase corrector demodulates a received OFDM signal and estimates a frequency offset based on a rotation among subcarriers of a phase difference between a modulation point and a reception signal point.

8. A wireless communication method for synthesizing signals received from a plurality of antennas to separate the signals into synthesis signals of a plurality of logical channels, the wireless communication method comprising:
- a first phase correction step of correcting a phase of a reception signal by estimating an amount of phase correction by a frequency offset of each reception signal from the plurality of antennas;
- a synthesis step of synthesizing reception signals after phase correction at the first phase correction step to separate the reception signals into synthesis signals of the plurality of logical channels; and
- a second phase correction step of correcting a phase of a synthesis signal by estimating a second amount of phase correction by a residual frequency offset after the phase correction at the first phase correction step based on the synthesis signal synthesized at the synthesis step,
- wherein in a multicarrier transmission, the second phase correction step determines the second amount of phase correction of each subcarrier by unifying the frequency offset and a phase shift by a timing offset and performs phase correction, and
- wherein the second phase correction step puts a phase difference indicative of the frequency offset or the timing offset into a vector on an IQ plane, obtains an average value with the magnitude of the vector being a weight, and estimates the second amount of phase correction by the frequency offset or the timing offset.

9. The wireless communication method according to claim 8, wherein the second phase correction step determines an amount of phase correction separately for each logical channel based on a frequency offset and a timing offset which are estimated from each logical channel and performs phase correction for each logical channel.

10. The wireless communication method according to claim 8, wherein the second phase correction step determines an amount of phase correction common to all logical channels by unifying a frequency offset and a timing offset which are estimated from a synthesis signal of each logical channel and performs phase correction for each logical channel based on the amount of phase correction.

11. The wireless communication method according to claim 8, wherein the second phase correction step averages a frequency offset and a timing offset which are estimated for each logical channel, with a weight corresponding to a response of each logical channel.

12. The wireless communication method according to claim 8, wherein in OFDM modulation as a multicarrier transmission system, the second phase correction step estimates a frequency offset using a pilot subcarrier in a received OFDM signal.

13. The wireless communication method according to claim 8, wherein in OFDM modulation as a multicarrier transmission system, the second phase correction step demodulates a received OFDM signal and estimates a frequency offset based on a phase difference between a modulation point and a reception signal point.

14. The wireless communication method according to claim 8, wherein in OFDM modulation as a multicarrier transmission system, the second phase correction step demodulates a received OFDM signal and estimates a frequency offset based on a rotation among subcarriers of a phase difference between a modulation point and a reception signal point.

15. The wireless communication apparatus according to claim 1, wherein frequency offsets of pilot subcarriers are estimated by multiplying the synthesis signals with complex conjugates of channel estimates.

16. The wireless communication apparatus according to claim 15, wherein squares of the complex conjugates of the channel estimates are inputted into two demodulators.

* * * * *